United States Patent
Tang et al.

(10) Patent No.: US 12,425,326 B2
(45) Date of Patent: Sep. 23, 2025

(54) DISTRIBUTED TRANSIT GATEWAY

(71) Applicant: INTERNATIONAL BUSINESS MACHINES CORPORATION, Armonk, NY (US)

(72) Inventors: Gang Tang, Nanjing (CN); Lei Bao, Wuxi (CN); Ming Shuang Xian, Wuxi (CN); Goutham Kondapavuluru, Bengaluru (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 19 days.

(21) Appl. No.: 18/485,254

(22) Filed: Oct. 11, 2023

(65) Prior Publication Data
US 2025/0126043 A1  Apr. 17, 2025

(51) Int. Cl.
*H04L 45/02* (2022.01)
*H04L 12/66* (2006.01)

(52) U.S. Cl.
CPC .............. *H04L 45/02* (2013.01); *H04L 12/66* (2013.01)

(58) Field of Classification Search
CPC .......... H04L 45/02; H04L 12/66; H04L 69/03
See application file for complete search history.

(56) References Cited

U.S. PATENT DOCUMENTS

| | | | |
|---|---|---|---|
| 11,159,569 B2 | 10/2021 | Janakiraman et al. | |
| 11,196,591 B2 | 12/2021 | Hira et al. | |
| 11,533,231 B2 | 12/2022 | Qian et al. | |
| 2020/0067734 A1* | 2/2020 | Hira | H04L 45/72 |
| 2024/0179071 A1* | 5/2024 | Zhou | H04L 41/0895 |
| 2024/0236095 A1* | 7/2024 | Wei | H04L 63/0263 |

FOREIGN PATENT DOCUMENTS

| | | |
|---|---|---|
| CN | 114556871 A | 5/2022 |
| CN | 115499434 A | 12/2022 |
| WO | 2021136311 A1 | 7/2021 |
| WO | 2022177829 A1 | 8/2022 |
| WO | 2022232441 A1 | 11/2022 |

OTHER PUBLICATIONS

"A method to optimize the cross region traffic through transit gateway," IP.com, IP.com No. IPCOM000227728D, Jul. 25, 2023, 5 pp.
A. Sajassi, et al., "A Network Virtualization Overlay Solution Using Ethernet VPN (EVPN)", RFC 4365 Network Virtualization Overlay Solution, Internet Engineering Task Force (IETF), Mar. 2018, 33pp., [online] https://www.rfc-editor.org/rfc/rfc8365.

* cited by examiner

*Primary Examiner* — Schquita D Goodwin
*Assistant Examiner* — Joseph M Cousins
(74) *Attorney, Agent, or Firm* — KONRAD, RAYNES, DAVDA & VICTOR LLP; Rabindranath Dutta

(57) ABSTRACT

Provided are a method, system, and computer program product in which a cross virtual private cloud (VPC) network connectivity is configured, wherein one or more policies have been defined by entities in the VPC. Policy changes are monitored, and based on the one or more policies, an adding of endpoints or topology information from a source VPC to a target VPC is performed, in response to a policy definition allowing the adding of the endpoints. Operations are performed for removing external endpoints or topology information from an affected VPC, in response to receiving a denial indication.

20 Claims, 9 Drawing Sheets

DISTRIBUTED TRANSIT GATEWAY

BACKGROUND

Embodiments relate to a method, system, and computer program product for a distributed transit gateway.

A virtual private cloud (VPC) is a public cloud offering that allows an enterprise to establish its own private cloud-like computing environment on shared public cloud infrastructure. A VPC provides an enterprise with the ability to define and control a virtual network that is logically isolated from all other public cloud tenants, thereby creating a private, secure place on the public cloud. With the introduction of the described isolation levels, an organization using a VPC service is in effect operating on a "virtually private cloud" in which the cloud infrastructure is not shared with other users, and hence the term VPC is used for such a cloud offering.

SUMMARY

Provided are a method, system, and computer program product in which a cross virtual private cloud (VPC) network connectivity is configured, wherein one or more policies have been defined by entities in the VPC. Policy changes are monitored, and based on the one or more policies, an adding of endpoints or topology information from a source VPC to a target VPC is performed, in response to a policy definition allowing the adding of the endpoints. Operations are performed for removing external endpoints or topology information from an affected VPC, in response to receiving a denial indication.

In additional embodiments operations are performed to monitor topology information changes on each node, and besides adding or removing corresponding entries in an associated VPC, operations are formed for examining the one or more polices to add or remove external entries in affected VPCs.

In further embodiments while forwarding a packet, operations are performed for first using a local topology information to determine a destination endpoint and then forwarding the packet accordingly.

In additional embodiments, in response to determining that a destination is not associated with any endpoint in local topology, operations are performed for using external topology information to determine a destination endpoint and forward a packet accordingly.

In certain embodiments, the one or more policies defined by entities in the VPC include what to import and what to export.

In further embodiments, a workflow includes a routes propagation mechanism and a packet forwarding mechanism.

In yet further embodiments, a controller includes a policy manager and is coupled to a policy database, and each node includes a policy propagator and a topology information.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized, and structural and operational changes may be made.

From the perspective of network security and isolation, different organizations and different departments of the same organization should use different VPCs to deploy resources, thereby isolating access between resources and ensuring maximum network security, both within the same organization or between different organizations. There may be common services among different departments, such as authentication servers, domain name servers, software upgrade servers, and so on, within an organization. All the different departments need to access these common services. For network isolation and security, these common services are usually deployed in different VPCs. So, a requirement for the cloud provider may be to provide interconnection between different VPCs.

Certain embodiments eliminate the need for centralized equipment to realize the function of a transit gateway. Certain embodiments implement intercommunication between VPCs by specifying a policy in the VPC network. This approach has the following advantages:

(a) It is a software transit gateway, which is flexible to deploy, and does not require proprietary equipment, and as a result reduces costs.

(b) It is a distributed transit gateway implementation solution that may be seamlessly integrated with existing mechanisms, and it eliminates the bottleneck of centralized transit gateway throughput.

Figure 1:
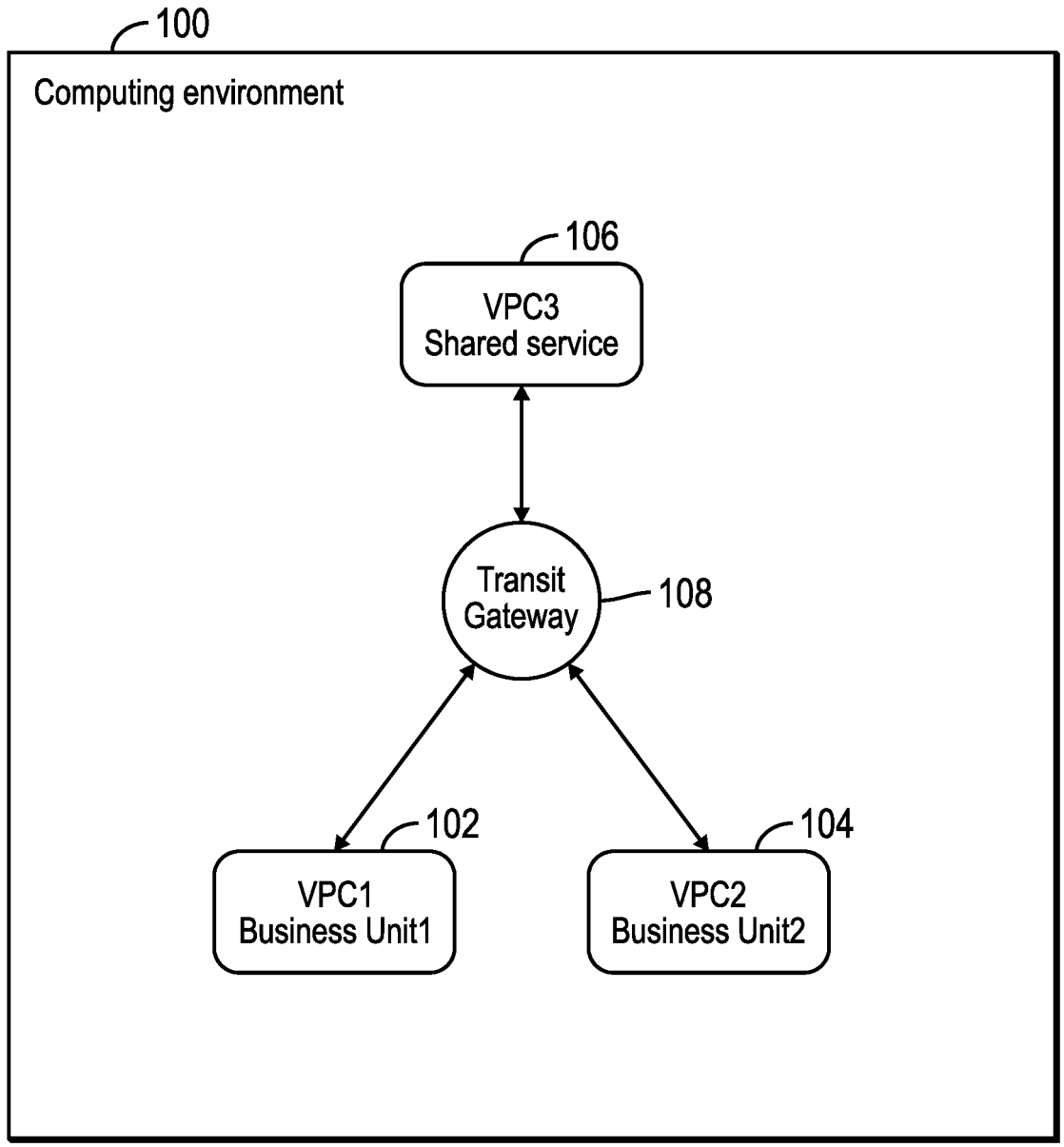
FIG. 1 illustrates a block diagram of a computing environment, in accordance with certain embodiments.

FIG. 1 illustrates a block diagram of a computing environment 100, in accordance with certain embodiments.

In FIG. 1, an exemplary VPC interconnection mechanism to connect different VPCs through a transit gateway, and an exemplary network topology is shown. VPC1 is a first VPC located at a first business unit (Business Unit1) as shown via reference numeral 102. VPC2 is a second VPC located at a second business unit (Business Unit2) as shown via reference numeral 104. VPC1 and VPC2 are in communication with a third VPC (VPC3) 106 that provides shared services, where the communication of VPC1 102 and VPC2 104 to VPC3 106 takes place over a transit gateway 108.

In certain embodiments, the transit gateway 108 may be implemented by a single component implemented in hardware or software, where the transit gateway connects different VPCs and provides packet routing between different VPCs. However, the traditional transit gateway has the following disadvantages:
(a) For the cloud provider, new equipment and its deployment costs are increased; and
(b) For cloud users, centralized devices have performance bottlenecks.

Figure 2:
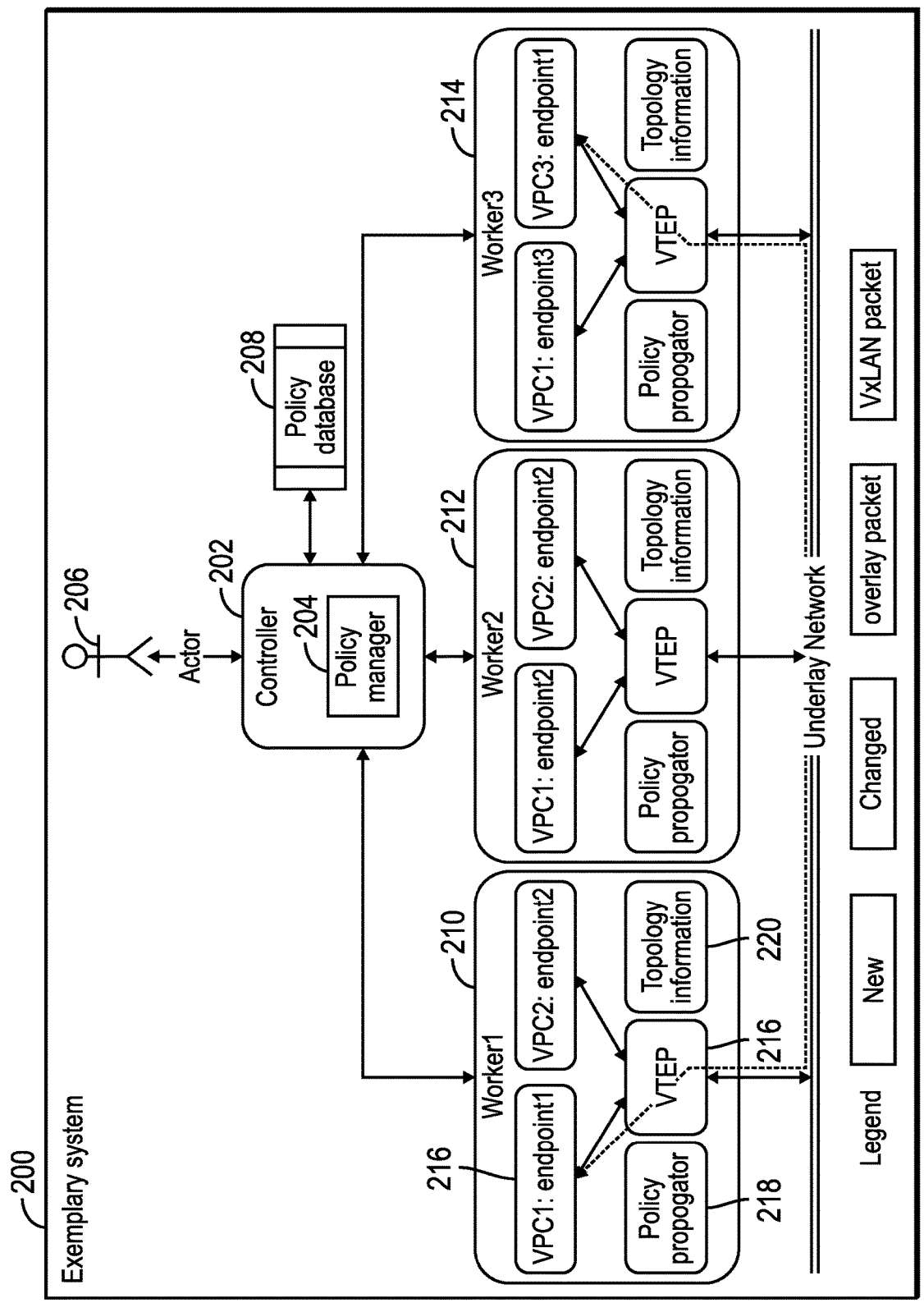
FIG. 2 illustrates a block diagram of an exemplary system, in accordance with certain embodiments.

FIG. 2 illustrates a block diagram of an exemplary system 200, in accordance with certain embodiments.

The exemplary embodiments add the policy manager and policy propagator, and enhance the topology information. The communication between VPCs is controlled by a VxLAN Tunnel End Point (VTEP) with the topology information.

Certain embodiments eliminate the need for a centralized equipment to realize the function of the transit gateway. Certain embodiments implement intercommunication between VPCs by specifying a policy in the VPC network. This approach has the following advantages:
(a) It is a software transit gateway, which is flexible to deploy, does not require proprietary equipment, and reduces deployment costs.
(b) It is a distributed transit gateway implementation solution that can seamlessly be integrated with existing software data network (SDN) datapaths, and eliminates the bottleneck of centralized transit gateway throughput.

The above architecture includes a variety of components as described below and illustrated in FIG. 2.

A controller 202 is a component that is a centralized management node. The management node provides facilities for the management of the entire system and provides a user management interface. In the controller 204, certain embodiments include the policy manager 204. Users (actors 206) configure the connectivity between VPCs through the policy manager's centralized management interface. At the same time, the policy manager 204 may convert the user configuration into a policy for connecting between VPCs and store it in the policy database 208.

Figure 3:
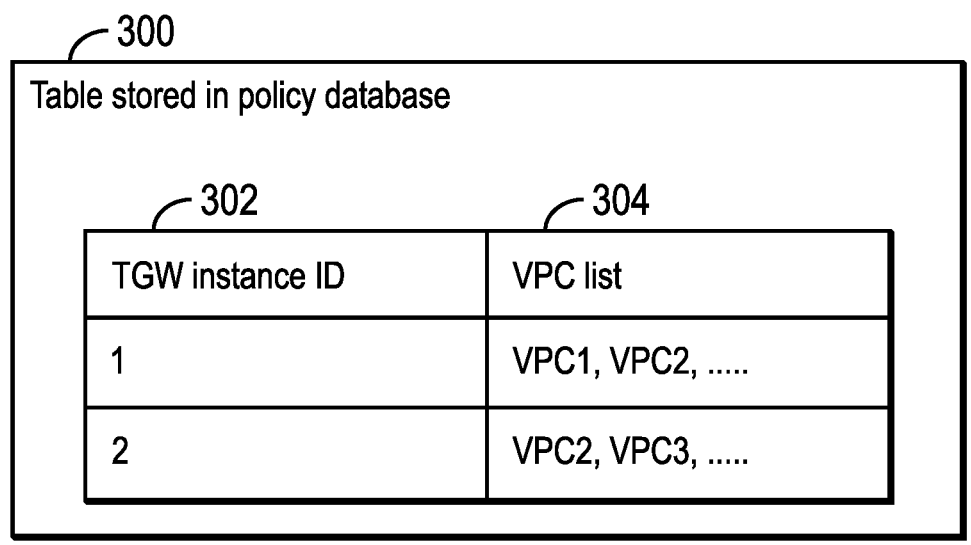
FIG. 3 illustrates a block diagram that shows tables stored in a policy database, in accordance with certain embodiments.

The policy database 208 is used to store the configuration information of the user's transit gateway. It includes the transit gateway instance identifier (ID) created by the user and its included VPC ID list, and the corresponding information is shown in FIG. 3 as a table 300 stored in the policy database 208. For each transit gateway instance identifier (ID) 302 the VPC list 304 is shown.

In FIG. 2, the exemplary worker nodes 210. 212, 214 (the worker nodes are computers) are used to host the virtual machine of the user, and at the same time realize the network virtualization function corresponding to the VPC, to realize the connection of the virtual machine to a specific VPC.

In FIG. 2, the exemplary VPC endpoints such as VPC1 endpoint1 216 provide the connectivity point between a virtual machine and the VPC, and is an existing software component.

Each worker node also has a VxLAN Tunnel End Point (VTEP) component. For example, VTEP 216 implements specific forwarding strategy on the worker node. It forwards the corresponding packets to the virtual interface or encapsulates them as VxLAN packets and forwards them to the network according to the topology information.

A policy propagator 218 component in each worker node is a newly added software component. To achieve network isolation, VTEP may only forward packets to the same VPC by default. The policy propagator 218 propagates the topology information of other VPCs to the local VPC according to the policy configured by the user, and the VTEP realizes cross-VPC forwarding by lookup of the endpoint information of other interconnected VPCs.

Policy propagator 218 is a newly added software component in certain embodiments on a host, such as a computer referred to as Worker1 100 or as a worker node. To achieve network isolation, VTEP may only forward packets to the same VPC by default. The policy propagator 218 propagates the topology information of other VPCs to the local VPC according to the policy configured by the user, and the VTEP realizes cross-VPC forwarding by lookup of the endpoint information of other interconnected VPCs, and the policy propagator 218 monitors the changes in the policy database. When a new transit gateway instance is created, the VPCs are added to the transit gateway instance. The policy propagator 218 exports routes in the local router to the controller 202. Meanwhile, the policy propagator 218 watches the changes in the local router, when a new route is learned, or an old route is withdrawn. The policy propagator 218 synchronizes the changes to the controller.

The policy propagator 218 will get a notification from the controller 202 when other policy propagators export local routes to the controller 202. Certain embodiments import the routes of other VPCs to the external router of this VPC according to the configuration of the policy database 208. During the import process, the policy propagator 218 only imports the routes of other VPCs directly connected to a transit gateway with this VPC.

A topology information component 220 saves the network topology of each virtual machine in the VPC. In certain embodiments, VTEP relies on topology information to forward packets between virtual machines. In certain embodiments, it can be abstracted into the components shown in FIG. 4.

Figure 4:
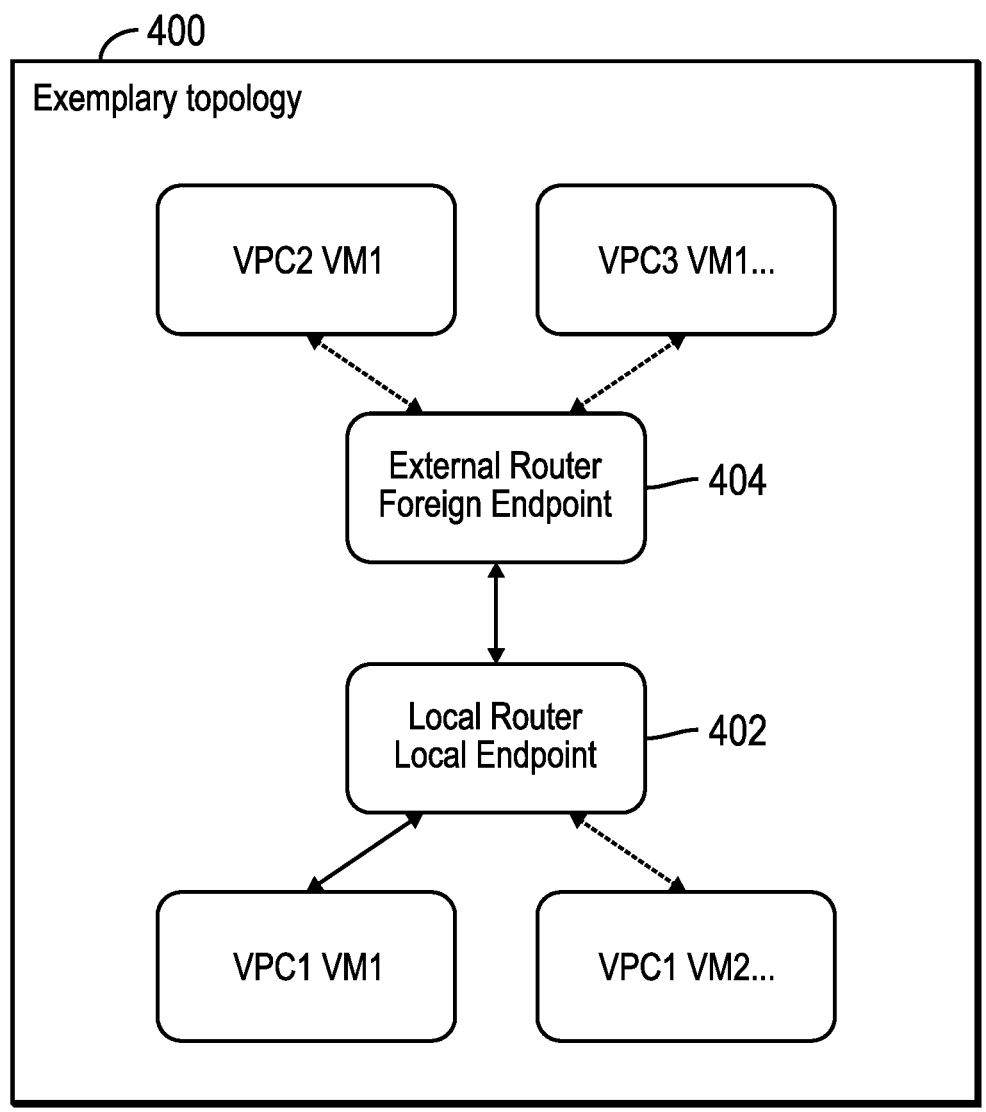
FIG. 4 illustrates a block diagram that shows an exemplary topology, in accordance with certain embodiments.

The components include a local router 402 that may be referred to as a local endpoint and an external router 404 that may be referred to as a foreign endpoint (as shown in FIG. 4).

Figure 5:
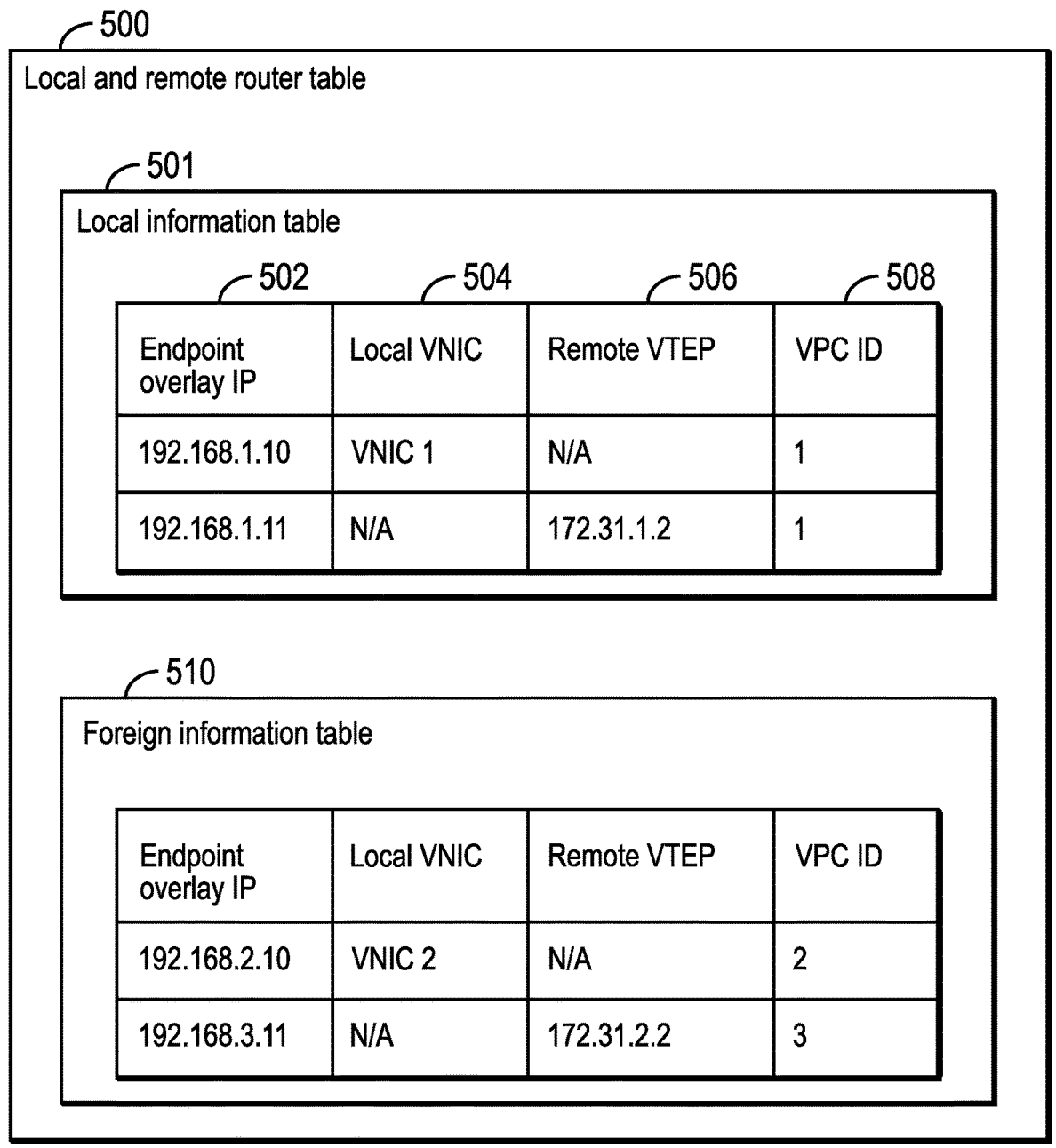
FIG. 5 illustrates a block diagram that shows a local and a remote router table, in accordance with certain embodiments.

FIG. 5 shows a block diagram 500 of local and a remote router table.

The local router table comprises a local information table 501 in which the local router 402 saves the endpoint information of a local VPC. There are four columns in the table comprising an endpoint overlap internet protocol (IP) 502, a local Virtual Network Interface Card (VNIC) 504, a remote VTEP 506 and a VPC identifier (ID) 508. An exemplary foreign information table 510 is also shown.

When a VTEP receives a packet from the virtual machine, it first does a lookup for the local router and forwards the packet to the corresponding local VNIC or remote VETP if one entry is hit. The local router table can be generated through the control plane or can be learned automatically by establishing external border gateway protocol (EBGP) between VTEP. The address learning details may be found in the publication RFC 8365 entitled "Network Virtualization Overlay Solution" available at www.rfc-editor.org.

The External router 404 of FIG. 4 saves the endpoint information of other VPCs connected to the transit gateway instance, and its table format is the same as that of the local router. The external router is generated by the policy propagator based on the user's policy configuration. For example, when transit gateway 1 is connected to VPC1 and VPC2, the policy propagator will propagate the endpoint information of VPC2 to the external router of VPC1. When the VTEP does not find the corresponding endpoint by lookup of the local router in VPC1, it continues to search for the endpoint in the external router of VPC1. If one entry is hit in the external router, it forwards the packet to the corresponding virtual interface or remote VTEP.

Figure 6:
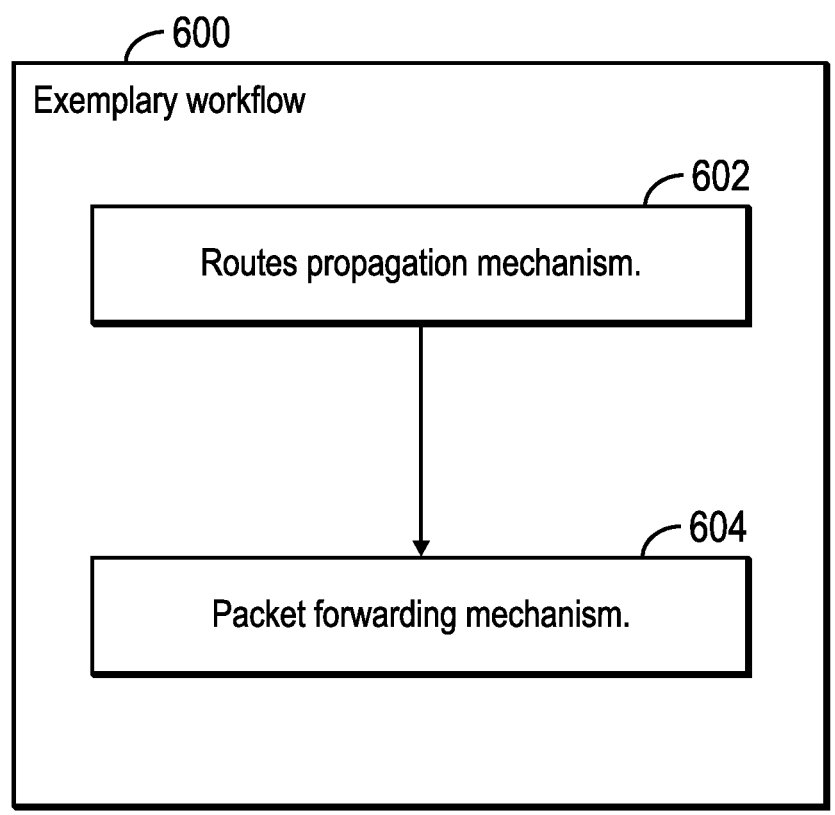
FIG. 6 illustrates a block diagram that shows an exemplary workflow, in accordance with certain embodiments.

FIG. 6 shows an exemplary workflow 600 that includes a routes propagation mechanism 602 and a packet forwarding mechanism 604.

In the routes propagation mechanism 602, the route in the local router may be generated via an existing approach. However, the routes in the external router may be generated by the policy propagator as per the approach below:

For determining export routes in local router, the policy propagator monitors the changes in the policy database. When a new transit gateway instance is created, the VPCs are added to the transit gateway instance. The policy propagator exports routes in the local router to the controller. Meanwhile, the policy propagator watches the changes in the local router, and also watches when a new route is learned, or an old route is withdrawn. The policy propagator synchronizes the changes to the controller;

For determining import routes into the external router, the policy propagator will get a notification from the controller when other policy propagators export local routes to the controller. They also import the routes of other VPCs to the external router of this VPC according to the configuration of the policy database. During the import process, the policy propagator only imports the routes of other VPCs directly connected to a transit gateway with this VPC. For example, in table shown in FIG. 3, VPC1 and VPC2 are connected through transit gateway1, and VPC2 and VPC3 are connected through transit gateway2. The policy propagator will import the local routes of VPC2 to the external routers of VPC1 and VPC3. At the same time, operations are performed to import the local routes of VPC1 and VPC3 to the external router of VPC2. However, the local routes of VPC3 will not be imported to the external router of VPC1. In this way, it is ensured that VPC1 will only communicate with VPC2 while ensuring the isolation between VPC1 and VPC3.

In the packet forwarding mechanism, ss described in the topology information above, when VTEP receives the packet forwarded by the virtual machine (VM), it first looks up the local router according to the existing implementation, and if the lookup is a hit, it directly forwards the packet to the corresponding interface. If the lookup fails, the VTEP continues to look up the external router, and if the lookup is hit, the VTEP forwards the packet to the corresponding port in the external router.

As shown in the tables depicted in FIG. 5, if the result of the external router is a local virtual network interface (VNIC), it will directly forward the packet to the corresponding local interface. If the lookup result of the external router is a remote VTEP, the VTEP will encapsulate the packet and forward it to the corresponding remote VTEP. During the encapsulation process, since the external routers correspond to the VPCs interconnected through the transit gateway, the VPC ID in the encapsulated packet will be different from the VPC ID to which the current packet belongs.

When the packet reaches the remote VTEP, the remote VTEP decapsulates the packet and obtains the VPC ID in the encapsulated packet. The process gets topology information via the VPC ID in the encapsulated packet. The process looks up the local router of the topology information again. Theoretically, the local router will have a local VNIC corresponding to the packet. Then the remote VTEP forwards the packet to the local VNIC, and the packet reaches the target VM.

In the above process, regardless of whether the external router directly forwards the packet to the local VNIC or forwards the packet to a remote VTEP, the forwarding information contained in the external router belongs to different VPCs, which means that the external router implements cross-VPC forwarding.

Figure 7:
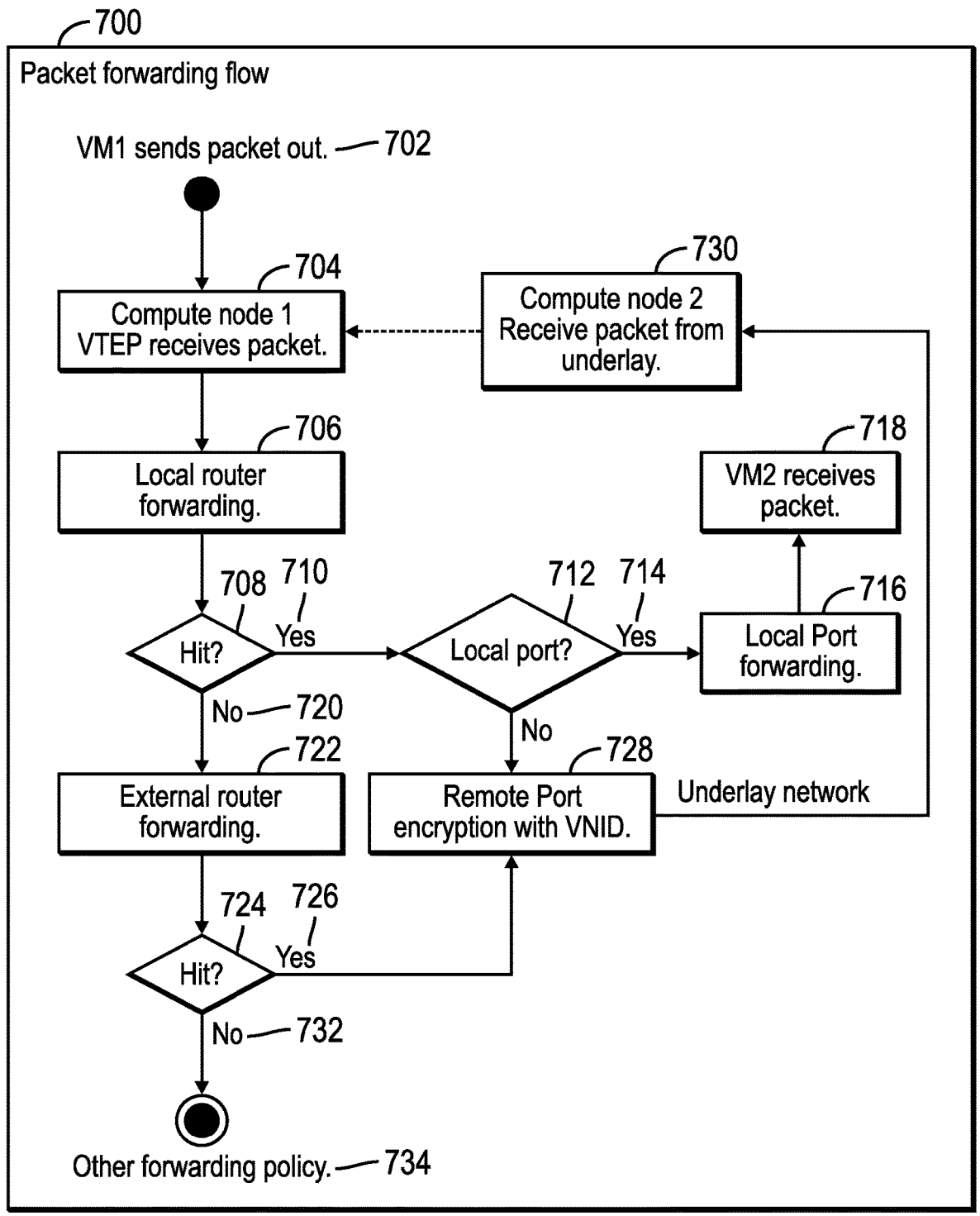
FIG. 7 illustrates a flowchart that shows a packet forwarding flow, in accordance with certain embodiments.

FIG. 7 shows a flowchart 700 that illustrates an exemplary packet forwarding flow, in accordance with certain embodiments.

The process starts when VM1 sends a packet out (shown via reference numeral 702). The compute node 1 VTEP receives the packet (at block 704). A local router-based forwarding is performed (at block 706), and if there is a hit (reference numeral 708, 710) than a determination is made as to whether the packet is for the local port (at block 712), and if the packet is for local port (branch 714) then local port forwarding (block 716) is performed and VM2 receives packets 718.

If there is no hit at block 708 ("No" branch 720) then control proceeds to block 722 for external router forwarding and if there is a hit (block 724 and "yes" branch 726) then remote port encryption with VNID is performed (at block 728) and via the underlay network control proceeds to block 730 in which the compute node 2 receives packet from the underlay network.

If there is no hit at block 724 ("No" branch 732) then other forwarding policies are adopted at block 734.

Figure 8:
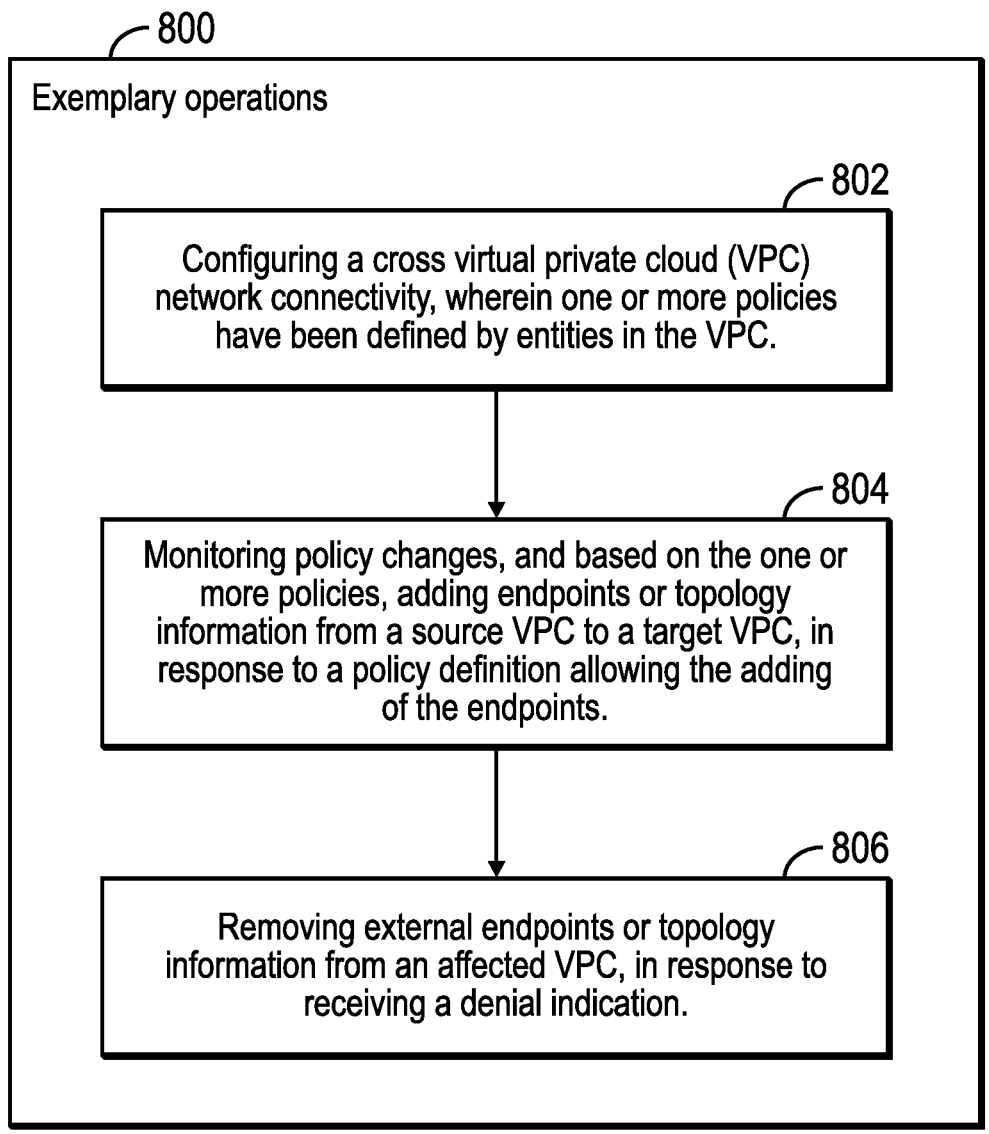
FIG. 8 illustrates a flowchart that shows exemplary operations, in accordance with certain embodiments.

FIG. 8 shows a flowchart of exemplary operations, in accordance with certain embodiments.

A cross virtual private cloud (VPC) network connectivity is configured, wherein one or more policies have been defined by entities in the VPC (at block 802). Policy changes are monitored, and based on the one or more policies, an adding of endpoints or topology information from a source VPC to a target VPC is performed, in response to a policy definition allowing the adding of the endpoints (at block 804). Operations are performed for removing external endpoints or topology information from an affected VPC, in response to receiving a denial indication (at block 806).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Figure 9:
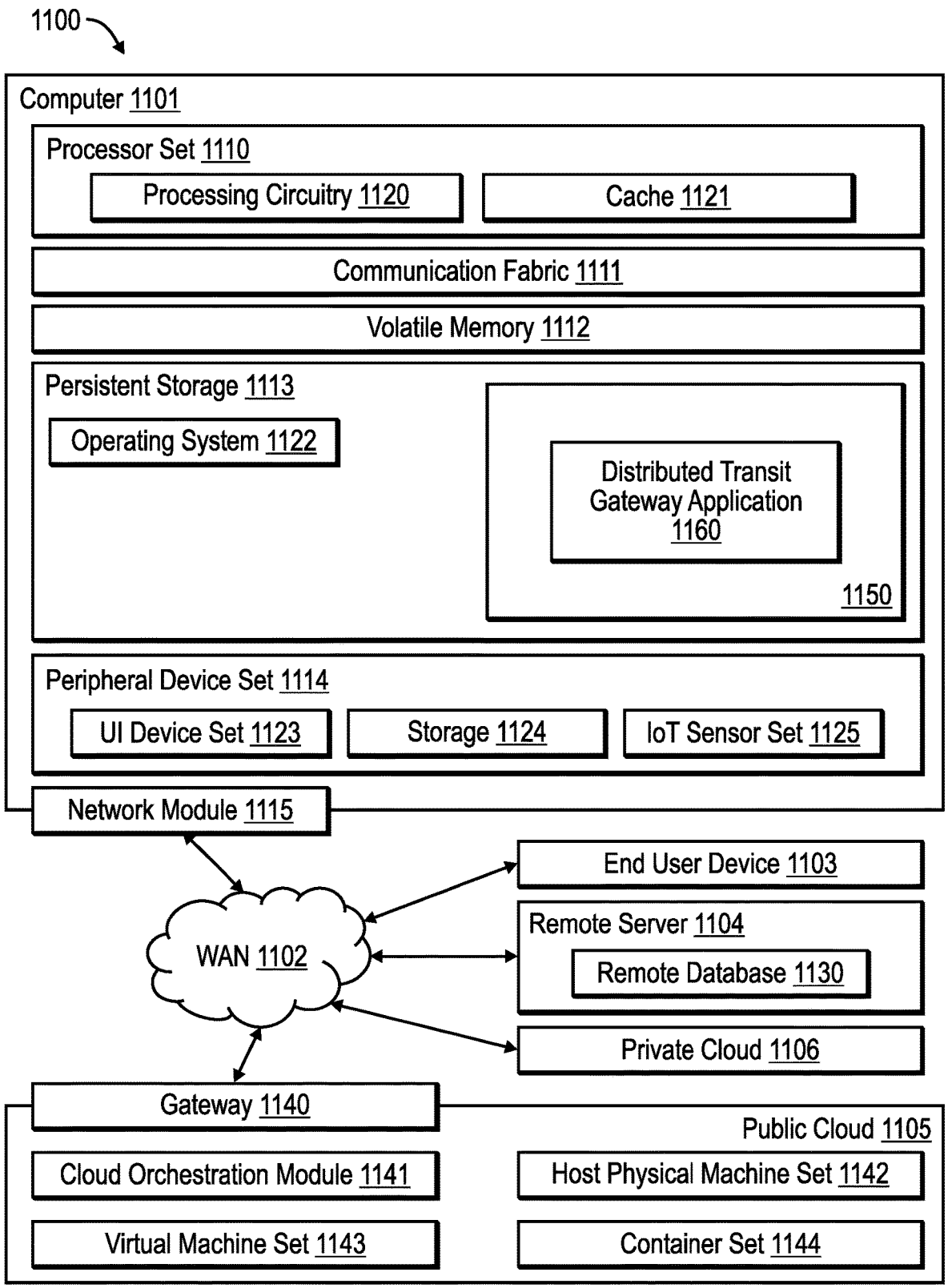
FIG. 9 illustrates a computing environment in which certain components may be implemented, in accordance with certain embodiments.

In FIG. 9, computing environment 1100 contains an example of an environment for the execution of at least some of the computer code (block 1150) involved in performing the operations of a distributed transit gateway application 1160 that performs operations shown in FIGS. 1-8.

In addition to block 1150, computing environment 1100 includes, for example, computer 1101, wide area network (WAN) 1102, end user device (EUD) 1103, remote server 1104, public cloud 1105, and private cloud 1106. In this embodiment, computer 1101 includes processor set 1110 (including processing circuitry 1120 and cache 1121), communication fabric 1111, volatile memory 1112, persistent storage 1113 (including operating system 1122 and block 1150, as identified above), peripheral device set 1114 (including user interface (UI) device set 1123, storage 1124, and Internet of Things (IoT) sensor set 1125), and network module 1115. Remote server 1104 includes remote database 1130. Public cloud 1105 includes gateway 1140, cloud orchestration module 1141, host physical machine set 1142, virtual machine set 1143, and container set 1144.

COMPUTER 1101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1130. As is well understood in the art of computer technology, and depending upon the technology, performance of a computer-implemented method may be distributed among multiple computers and/or between multiple locations. On the other hand, in this presentation of computing environment 1100, detailed discussion is focused on a single computer, specifically computer 1101, to keep the presentation as simple as possible computer 1101 may be located in a cloud, even though it is not shown in a cloud in FIG. 8. On the other hand, computer 1101 is not required to be in a cloud except to any extent as may be affirmatively indicated.

PROCESSOR SET 1110 includes one, or more, computer processors of any type now known or to be developed in the future. Processing circuitry 1120 may be distributed over multiple packages, for example, multiple, coordinated integrated circuit chips. Processing circuitry 1120 may implement multiple processor threads and/or multiple processor cores. Cache 1121 is memory that is located in the processor chip package(s) and is typically used for data or code that should be available for rapid access by the threads or cores running on processor set 1110. Cache memories are typically organized into multiple levels depending upon relative proximity to the processing circuitry. Alternatively, some, or all, of the cache for the processor set may be located "off chip." In some computing environments, processor set 1110 may be designed for working with qubits and performing quantum computing.

Computer readable program instructions are typically loaded onto computer 1101 to cause a series of operational steps to be performed by processor set 1110 of computer 1101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1121 and the other storage media discussed below. The program instructions, and associated data, are accessed by processor set 1110 to control and direct performance of the inventive methods. In computing environment 1100, at least some of the instructions for performing the inventive methods may be stored in block 1150 in persistent storage 1113.

COMMUNICATION FABRIC 1111 is the signal conduction path that allows the various components of computer 1101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1112 is any type of volatile memory now known or to be developed in the future. Examples include dynamic type random access memory (RAM) or static type RAM. Typically, volatile memory 1112 is characterized by random access, but this is not required unless affirmatively indicated. In computer 1101, the volatile memory 1112 is located in a single package and is internal to computer 1101, but, alternatively or additionally, the volatile memory may be distributed over multiple packages and/or located externally with respect to computer 1101.

PERSISTENT STORAGE 1113 is any form of non-volatile storage for computers that is now known or to be developed in the future. The non-volatility of this storage means that the stored data is maintained regardless of whether power is being supplied to computer 1101 and/or directly to persistent storage 1113. Persistent storage 1113 may be a read only memory (ROM), but typically at least a portion of the persistent storage allows writing of data, deletion of data and re-writing of data. Some familiar forms of persistent storage include magnetic disks and solid-state storage devices. Operating system 1122 may take several forms, such as various known proprietary operating systems or open-source Portable Operating System Interface-type operating systems that employ a kernel. The code included in block 1150 typically includes at least some of the computer code involved in performing the inventive methods.

PERIPHERAL DEVICE SET 1114 includes the set of peripheral devices of computer 1101. Data communication connections between the peripheral devices and the other components of computer 1101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1123 may include components such as a display screen, speaker, microphone, wearable devices (such as goggles and smart watches), keyboard, mouse, printer, touchpad, game controllers, and haptic devices. Storage 1124 is external storage, such as an external hard drive, or insertable storage, such as an SD card. Storage 1124 may be persistent and/or volatile. In some embodiments, storage 1124 may take the form of a quantum computing storage device for storing data in the form of qubits. In embodiments where computer 1101 is required to have a large amount of storage (for example, where computer 1101 locally stores and manages a large database) then this storage may be provided by peripheral storage devices designed for storing very large amounts of data, such as a storage area network (SAN) that is shared by multiple, geographically distributed computers. I/O T sensor set 1125 is made up of sensors that can be used in Internet of Things applications. For example, one sensor may be a thermometer and another sensor may be a motion detector.

NETWORK MODULE 1115 is the collection of computer software, hardware, and firmware that allows computer 1101 to communicate with other computers through WAN 1102. Network module 1115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1115 are performed on the same physical hardware device. In other embodiments (for example, embodiments that utilize software-defined networking (SDN)), the control functions and the forwarding functions of network module 1115 are performed on physically separate devices, such that the control functions manage several different network hardware devices. Computer readable program instructions for performing the inventive methods can typically be downloaded to computer 1101 from an external computer or external storage device through a network adapter card or network interface included in network module 1115.

WAN 1102 is any wide area network (for example, the internet) capable of communicating computer data over non-local distances by any technology for communicating computer data, now known or to be developed in the future. In some embodiments, the WAN 1102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1103 is any computer system that is used and controlled by an end user (for example, a customer of an enterprise that operates computer 1101), and may take any of the forms discussed above in connection with computer 1101. EUD 1103 typically receives helpful and useful data from the operations of computer 1101. For example, in a hypothetical case where computer 1101 is designed to provide a recommendation to an end user, this recommendation would typically be communicated from network module 1115 of computer 1101 through WAN 1102 to EUD 1103. In this way, EUD 1103 can display, or otherwise present, the recommendation to an end user. In some embodiments, EUD 1103 may be a client device, such as thin client, heavy client, mainframe computer, desktop computer and so on.

REMOTE SERVER 1104 is any computer system that serves at least some data and/or functionality to computer 1101. Remote server 1104 may be controlled and used by the same entity that operates computer 1101. Remote server 1104 represents the machine(s) that collect and store helpful and useful data for use by other computers, such as computer 1101. For example, in a hypothetical case where computer 1101 is designed and programmed to provide a recommendation based on historical data, then this historical data may be provided to computer 1101 from remote database 1130 of remote server 1104.

PUBLIC CLOUD 1105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1105 is performed by the computer hardware and/or software of cloud orchestration module 1141. The computing resources provided by public cloud 1105 are typically implemented by virtual computing environments that run on various computers making up the computers of host physical machine set 1142, which is the universe of physical computers in and/or available to public cloud 1105. The virtual computing environments (VCEs) typically take the form of virtual machines from virtual machine set 1143 and/or containers from container set 1144. It is understood that these VCEs may be stored as images and may be transferred among and between the various physical machine hosts, either as images or after instantiation of the VCE. Cloud orchestration module 1141 manages the transfer and storage of images, deploys new instantiations of VCEs and manages active instantiations of VCE deployments. Gateway 1140 is the collection of computer software, hardware, and firmware that allows public cloud 1105 to communicate through WAN 1102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1106 is similar to public cloud 1105, except that the computing resources are only available for use by a single enterprise. While private cloud 1106 is depicted as being in communication with WAN 1102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1105 and private cloud 1106 are both part of a larger hybrid cloud.

The letter designators, such as i, is used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method, comprising:
   configuring a cross virtual private cloud network connectivity, wherein one or more policies have been defined by entities in a plurality of virtual private clouds (VPCs);
   monitoring policy changes, and based on the one or more policies, adding endpoints or topology information from a source VPC to a target VPC, in response to a policy definition allowing the adding of the endpoints;
   removing external endpoints or topology information from an affected VPC, in response to receiving a denial indication, wherein the source VPC, the target VPC, and the affected VPC are included in the plurality of VPCs; and
   determining export routes in a local router, by performing:
      monitoring, by a policy propagator, changes in a policy database;
      in response to a new transit gateway instance being created, adding other VPCs to the new transit gateway instance; and
      exporting, by the policy propagator, routes in the local router to a controller, and monitoring the changes in the local router, wherein in response to a new route being learned or an old route being withdrawn, synchronizing changes to the controller, wherein the local router saves an endpoint information of a local VPC in a local information table, and wherein an external router saves the endpoint information of the other VPCs added to the new transit gateway instance.

2. The method of claim 1, the method further comprising:
   on each worker node of a plurality of worker nodes, monitoring topology information changes, and besides adding or removing corresponding entries in an associated VPC also examining the one or more polices to add or remove external entries in affected VPCs.

3. The method for claim 1, the method further comprising:
   while forwarding a packet, first using a local topology information to determine a destination endpoint, and then forwarding the packet accordingly.

4. The method of claim 1, the method further comprising:
   in response to determining that a destination is not associated with any endpoint in local topology, using external topology information to determine a destination endpoint and forward a packet accordingly.

5. The method of claim 1, wherein the one or more policies defined by entities in the plurality of VPCs include what to import and what to export.

6. The method of claim 1, wherein a workflow includes a routes propagation mechanism and a packet forwarding mechanism.

7. The method of claim 1, wherein a controller includes a policy manager and is coupled to a policy database, and each node of a plurality of nodes includes a policy propagator and a topology information.

8. A system, comprising:
   a memory; and
   a processor coupled to the memory, wherein the processor performs operations, the operations comprising:
   configuring a cross virtual private cloud network connectivity, wherein one or more policies have been defined by entities in a plurality of virtual private clouds (VPCs);
   monitoring policy changes, and based on the one or more policies, adding endpoints or topology information from a source VPC to a target VPC, in response to a policy definition allowing the adding of the endpoints;

removing external endpoints or topology information from an affected VPC, in response to receiving a denial indication, wherein the source VPC, the target VPC, and the affected VPC are included in the plurality of VPCs; and determining export routes in a local router, by performing:
monitoring, by a policy propagator, changes in a policy database;
in response to a new transit gateway instance being created, adding other VPCs to the new transit gateway instance; and
exporting, by the policy propagator, routes in the local router to a controller, and monitoring the changes in the local router, wherein in response to a new route being learned or an old route being withdrawn, synchronizing changes to the controller, wherein the local router saves an endpoint information of a local VPC in a local information table, and wherein an external router saves the endpoint information of the other VPCs added to the new transit gateway instance.

9. The system of claim 8, the operations further comprising:
on each worker node of a plurality of worker nodes, monitoring topology information changes, and besides adding or removing corresponding entries in an associated VPC also examining the one or more polices to add or remove external entries in affected VPCs.

10. The system for claim 8, the operations further comprising:
while forwarding a packet, first using a local topology information to determine a destination endpoint, and then forwarding the packet accordingly.

11. The system of claim 8, the operations further comprising:
in response to determining that a destination is not associated with any endpoint in local topology, using external topology information to determine a destination endpoint and forward a packet accordingly.

12. The system of claim 8, wherein the one or more policies defined by entities in the plurality of VPCs include what to import and what to export.

13. The system of claim 8, wherein a workflow includes a routes propagation mechanism and a packet forwarding mechanism.

14. The system of claim 8, wherein a controller includes a policy manager and is coupled to a policy database, and each node of a plurality of nodes includes a policy propagator and a topology information.

15. A computer program product, the computer program product comprising a computer readable storage medium having computer readable program code embodied therewith, the computer readable program code when executed is configured to perform operations, the operations comprising:

configuring a cross virtual private cloud network connectivity, wherein one or more policies have been defined by entities in a plurality of virtual private clouds (VPCs);

monitoring policy changes, and based on the one or more policies, adding endpoints or topology information from a source VPC to a target VPC, in response to a policy definition allowing the adding of the endpoints;

removing external endpoints or topology information from an affected VPC, in response to receiving a denial indication, wherein the source VPC, the target VPC, and the affected VPC are included in the plurality of VPCs; and determining export routes in a local router, by performing:
monitoring, by a policy propagator, changes in a policy database;
in response to a new transit gateway instance being created, adding other VPCs to the new transit gateway instance; and
exporting, by the policy propagator, routes in the local router to a controller, and monitoring the changes in the local router, wherein in response to a new route being learned or an old route being withdrawn, synchronizing changes to the controller, wherein the local router saves an endpoint information of a local VPC in a local information table, and wherein an external router saves the endpoint information of the other VPCs added to the new transit gateway instance.

16. The computer program product of claim 15, the operations further comprising:
on each worker node of a plurality of worker nodes, monitoring topology information changes, and besides adding or removing corresponding entries in an associated VPC also examining the one or more polices to add or remove external entries in affected VPCs.

17. The computer program product for claim 15, the operations further comprising:
while forwarding a packet, first using a local topology information to determine a destination endpoint, and then forwarding the packet accordingly.

18. The computer program product of claim 15, the operations further comprising:
in response to determining that a destination is not associated with any endpoint in local topology, using external topology information to determine a destination endpoint and forward a packet accordingly.

19. The computer program product of claim 15, wherein the one or more policies defined by entities in the plurality of VPCs include what to import and what to export.

20. The computer program product of claim 15, wherein a workflow includes a routes propagation mechanism and a packet forwarding mechanism.

* * * * *